United States Patent Office 3,318,676
Patented May 9, 1967

3,318,676
CONTROLLING VEGETATION WITH HALOALKYL THIOLCARBAMATES
Marion W. Harman, Nitro, and John J. D'Amico, Charleston, W. Va., assignors to Monsanto Company, a corporation of Delaware
No Drawing. Filed July 10, 1959, Ser. No. 826,130
2 Claims. (Cl. 71—2.7)

The present invention relates to methods of controlling or destroying vegetation and to phytotoxic haloalkyl thiolcarbamates.

The toxicants employed in the practice of the present invention contain the nucleus

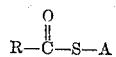

where A represents a halogen substituted alkl group, preferably a chloro or bromo substituted lower alkyl group, but fluorine and iodine are also suitable, and R represents a secondary amino group, nitrogen of which is linked to the carbonyl radical. A wide variety of secondary amino radicals are suitable, as for example morpholinyl, pyrrolidinyl, piperidinyl, lower alkyl substituted derivatives of these radicals, 4-phenylpiperazinyl, disubstituted amino radicals in which the substituents are lower alkyl, lower alkenyl, cyano substituted lower alkyl, halogen substituted lower alkenyl, lower alkoxy substituted lower alkyl, lower alkenoxy substituted lower alkyl, phenoxy substituted lower alkyl, combinations of these radicals or combinations of one of them with higher alkyl, propargyl, cyclohexyl, cyclohexenyl, phenyl, benzyl, furfuryl or tetrahydrofurfuryl. By alkenyl radical is meant an unsaturated acyclic radical the unsaturation of which consists in one double bond. It will be noted that the nitrogen of the amino group in the above formula is attached to three different carbon atoms, hydroxy on the nitrogen being absent. Preferably not more than one phenyl, cyclohexyl or benzyl group is present but combinations with other radicals have proved to be very desirable.

Examples of the toxicants comprise 2-chloroethyl, 2-bromoethyl, 2-iodoethyl, 2-fluoroethyl, chloromethyl, 2,3-dichloro-2-methylpropyl, 3-chloropropyl, 2-chloropropyl, 2-chlorobutyl, 2-chloroamyl, 2,3-dichloropropyl, and 2,3-dibromopropyl esters of the following thiolcarbamic acids: dimethyl-, diethyl-, dipropyl-, diisopropyl-, dibutyl-, diisobutyl-, diallyl-, N-allyl-N-isopropyl-, N-methyl-N-cyclohexyl-, N-ethyl-N-cyclohexyl-, di(methoxyethyl)-, di(methoxypropyl)-, N-(2-cyclohexenyl)- N-isopropyl-, N-(2-cyanoethyl)-N-isopropyl-, N-(2-chloroallyl)- N - isopropyl-, N-(2-chloroallyl)-N-3-methoxypropyl-, di(ethoxypropyl)-, di(2-phenoxyethyl)-, N-ethyl-N-2-phenoxyethyl-, di(2-chloroallyl)-, N-ethyl-N-vinyloxyethyl- and N-ethyl-N-isopropoxypropylthiolcarbamic acids, 4-moropholinecarbothiolic acid, 1-pyrrolidinecarbothiolic acid, 4-phenyl-1-piperazinecarbothiolic acid, 1-piperidinecarbothiolic acid, 2-methyl-1-piperidine-carbothiolic acid, 5-ethyl-2-methyl-1-piperidinecarbothiolic acid, 5-ethyl-3-methyl-1-piperidinecarbothiolic acid, 2,4,6-trimethyl-1-piperidinecarbothiolic acid and 2,6-dimethyl-morpholinecarbothiolic acid.

The compounds employed in the practice of this invention are new compounds. Preparation of the new toxicants is illustrated in detail below.

Example 1

There was charged to a reactor 110 parts by weight of 88% diisopropylamine, 200 parts by weight of water and 160 parts by weight of 25% sodium hydroxide. The charge was cooled to 0° C. and stirred while 78 parts by weight of 85% COS was bubbled in over a period of about an hour. The reaction mixture was kept below about 10° C. during the addition. There was then added in one portion 236.2 parts by weight of 3-chloropropylbromide. The reaction mixture was stirred at 25–30° C. for 24 hours and then extracted with ethyl ether. The ether extract was filtered to remove sodium chloride, washed with water until neutral to litmus, dried over sodium sulfate and the ether removed in vacuo at a maximum temperature of 80-90° C. at 1–2 mm. There was obtained 141 parts by weight of an amber oil. This was distilled in vacuo, the fraction boiling at 132-134° C. and 3.5 mm. being collected. It contained 5.8% nitrogen and 13.8% sulfur as compared to values calcuated for 3-chloropropyl diisopropylthiolcarbamate of 5.9% nitrogen and 13.5% sulfur.

Example 2

There was charged to a reactor 180 parts by weight of 25% dimethylamine and 160 parts by weight of 25% sodium hydroxide. The mixture was cooled to 0° C. and 78 parts by weight of 85% COS bubbled in at 0–10° C. over a period of about an hour. There was then added 236.2 parts by weight of 3-chloropropylbromide and stirring continued for 24 hours, the temperature during this phase of the reaction being 25–30° C. The reaction mixture was then extracted with ethyl ether and the ether solution washed with water until neutral to litmus, dried over sodium sulfate and the ether removed in vacuo. The residue was distilled in vacuo, collecting the fraction boiling at 125–126° C. at 4 mm. pressure. The product contained 7.6% nitrogen, 18.0% sulfur and 20.0% chlorine as compared to values calculated for 3-chloropropyl dimethylthiolcarbamate of 7.7% nitrogen, 17.7% sulfur and 19.5% chlorine.

Example 3

In the procedure of Example 1, 101.1 parts by weight of dipropylamine was substituted for 110 parts by weight of diisopropylamine. 3-chloropropyl dipropylthiolcarbamate was obtained as an oil, boiling point 145–147° C. at 3 mm. pressure. It contained 5.8% nitrogen, 13.3% sulfur and 15.5% chlorine as compared to calculated values of 5.9% nitrogen, 13.5% sulfur and 14.9% chlorine.

Example 4

In the procedure of Example 1, 73.2 parts by weight of diethyl amine was substituted for 110 parts by weight of 88% diisopropylamine. 3-chloropropyl diethylthiolcarbamate was obtained as an oil boiling point 148–150° C. at 10 mm. pressure. It contained 6.4% nitrogen, 15.3% sulfur and 16.5% chlorine as compared to calculated values of 6.7% nitrogen, 15.3% sulfur and 16.9% chlorine.

Example 5

There was charged to a reactor 110 parts by weight of 88% diisopropylamine, 200 parts by weight of water and 160 parts by weight of 25% sodium hydroxide. This mixture was cooled and stirred at 0–5° C. while adding to it 78 parts by weight of 85% COS over a period of about one and one-half hours. There was then added 375.8 parts by weight of ethylene dibromide in one portion. External cooling was discontinued and the reaction mixture stirred at 25–30° C. for 24 hours. The reaction mixture was extracted with ethyl ether, the ether extract dried over sodium sulfate and the ether removed in vacuo. The excess of 1,2-dibromoethane was removed by atmospheric distillation at a maximum pot temperature of 200° C. The residue was distilled in vacuo, collecting the fraction boiling point 136–138° C. at 4 mm. The distillate solidified upon standing. The product was dried on a porous plate at 25–30° C. It was a white solid melting at 51–53° C. Analysis gave 5.2% nitrogen, the value calculated for 2-bromoethyl diisopropylthiolcarbamate.

*Example 6*

There was charged to a reactor 103.4 parts by weight of 98% diisopropylamine, 160 parts by weight of 25% sodium hydroxide and 200 parts by weight of water. The mixture was stirred and cooled to 0° C. and to it at 0–5° C. 78 parts by weight of 85% COS was added over a period of about one and one-half hours. External cooling was discontinued, 254.4 parts by weight of 1,4-dichlorobutane added in one portion and the reaction mixture stirred at 25–30° C. for 24 hours. Thereupon there was added 400 parts by weight of water, stirring continued for 15 minutes, the bottom organic layer separated and dried over sodium sulfate. The excess of 1,4-dichlorobutane was removed by atmospheric distillation until the pot temperature reached 200° C. The residue was distilled in vacuo collecting the fraction boiling point 141–143° C. at 2 mm. pressure. It contained 5.5% nitrogen, the calculated value for 4-chlorobutyl diisopropylthiolcarbamate.

*Example 7*

In the procedure of Example 5 there was substituted 215.2 parts by weight of 2-chloroethylbromide for the 1,2-dibromoethane. The procedure was the same except that the excess 2-chloroethylbromide was removed by atmospheric distillation at a maximum pot temperature of 185° C. The product boiled at 116–118° C. at 2 mm. pressure. Upon standing it solidified. After drying on a porous plate the melting point was 37–39° C. Analysis gave 6.2% nitrogen, 14.4% sulfur and 15.3% chlorine as compared to values calculated for 2-chloroethyl diisopropylthiolcarbamate of 6.3% nitrogen, 14.3% sulfur and 15.9% chlorine.

*Example 8*

There was charged to a reactor 31.8 parts by weight of N-ethylcyclohexylamine, 50.0 parts by weight of water and 40 parts by weight of 25% sodium hydroxide. The charge was cooled to 0° C. and stirred while 19 parts by weight of 85% COS was bubbled in. The reaction mixture was kept below 10° C. during the addition. There was then added in one portion 47.3 parts by weight of 3-chloropropylbromide. The reaction mixture was stirred at 25–30° C. for 24 hours and then extracted with ethyl ether. The ether extract was filtered to remove sodium chloride, washed with water until neutral to litmus, dried over sodium sulfate and the ether removed in vacuo at a maximum temperature of 80–90° C. at 1–2 mm. There was obtained 55 parts by weight of amber liquid which contained 5.00% nitrogen, 12.51% sulfur and 13.67% chlorine compared to 5.31% nitrogen, 12.15% sulfur and 13.44% chlorine calculated for 3-chloropropyl N-ethyl-N-cyclohexylthiolcarbamate.

Replacing N-ethylcyclohexylamine by 34.8 parts by weight of N-isopropylcyclohexylamine in the foregoing procedure yielded 43 parts by weight of amber liquid which contained 4.96% nitrogen compared to 5.04% nitrogen calculated for 3-chloropropyl N-isopropyl-N-cyclohexylthiolcarbamate.

Replacing N-ethylcyclohexylamine by 28.3 parts by weight of N-methylcyclohexylamine and 3-chloropropylbromide by 43 parts by weight of 2-chloroethylbromide in the foregoing procedure yielded 34 parts by weight of amber liquid which contained 5.69% nitrogen compared to 5.94% nitrogen calculated for 2-chloroethyl N-methyl-N-cyclohexylthiolcarbamate.

The most effective control was observed from pre-emergent application whereby the toxicants were brought into contact with germinating seedlings but they are also somewhat toxic to foliage. By application to vegetation is meant either application to the soil before the plants emerge or to the foliage. The toxicants may be applied to the soil or to foliage conveniently in the form of a spray containing the active ingredient in a concentration within the range of 0.1%–5.0%. For pre-emergence application amounts within the range of 1 to 60 pounds per acre are recommended. The active components are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided or granular solid carrier, as for example talc, clay, pyrophyllite, silica and fuller's earth. Alternatively, the dry composition may be dispersed in water and applied as a spray.

As illustrative of the practice of the invention the toxicants were applied as aqueous sprays to a variety of germinating seedlings. The active ingredient was emulsified in water and applied to the soil of seeded plots at the rate shown before the grass or other plants emerged. The plants employed in the test are designated by letter. The plants corresponding to the letters are as follows:

A—Morning glory  H—Crab grass
B—Wild oats  J—Pigweed
C—Brome grass  K—Soybean
D—Rye grass  L—Wild buckwheat
E—Mustard (radish)  M—Tomato
F—Sugar beet  N—Sorghum
G—Foxtail For convenience in recording the data the following rating key was used:

No phytotoxicity _____ 0
Slight phytotoxicity _____ 1
Moderate phytotoxicity _____ 2
Severe phytotoxicity _____ 3

At a dosage as low as one-half pound per acre, 3-chloropropyl diisopropylthiolcarbamate exerted significant toxicity toward a number of grasses, notably brome grass and rye grass. The effectiveness was substantially increased by incorporating the toxicant into the top surface layer of the soil. Phytotoxicity rating observed by incorporating this toxicant into the surface soil are recorded below:

*Table I*

| Dosage, lbs./acre | Phytotoxicity Rating | | | | | | | | | | | |
|---|---|---|---|---|---|---|---|---|---|---|---|---|
| | A | B | C | D | E | F | G | H | J | K | L | M | N |
| ½ | 1 | 3 | 3 | 3 | 0 | 0 | 3 | 2 | 0 | 0 | 0 | 0 | 0 |
| ¼ | 1 | 3 | 3 | 2 | 0 | 1 | 2 | 2 | 0 | 0 | 0 | 0 | 0 |
| ⅛ | 0 | 1 | 2 | 1 | 0 | 0 | 0 | 0 | 0 | 0 | 0 | 0 | 0 |

In pre-emergence application at 25 pounds per acre 3-chloropropyl dipropylthiolcarbamate exerted severe phytotoxicity to morning glory, wild oats, brome grass, rye grass, foxtail, crab grass and pigweed. Similar results were observed with 3-chloropropyl diethylthiolcarbamate, 3-chloropropyl dimethylthiolcarbamate and 4-chlorobutyl diisopropylthiolcarbamate. Again the effectiveness of low rates of application was extended by incorporating the toxicants into the top soil surface. By following this expedient the following phytotoxicity ratings were observed at a dosage of one-half pound per acre with 3-chloropropylthiolcarbamate:

Table II.—Phytotoxicity rating

| | |
|---|---|
| A | -- |
| B | 3 |
| C | 3 |
| D | 3 |
| E | -- |
| F | -- |
| G | 2 |
| H | 3 |
| J | 3 |
| K | -- |
| L | -- |
| M | -- |
| N | 3 |

The foregoing is illustrative only of the useful class herein defined, any of which control vegtation although the amounts required for effective control will vary. Still other compounds representative of the new toxicants are 2-bromoethyl N-isopropyl-N-allylthiolcarbamate
2-chloroethyl N-isopropyl-N-allylthiolcarbamate
2-chloroethyl N-2-chloroallyl-N-allylthiolcarbamate
2-chloroethyl N-2-chloroallyl-N-isopropylthiolcarbamate
2-chloroethyl N-2-chloroallyl-N-propylthiolcarbamate
2-bromoethyl N-2-chloroallyl-N-isopropylthiolcarbamate
2-chloroethyl N-3-chloroallyl-N-ethylthiolcarbamate
2-chloroethyl N-2-chloroallyl N-3-methoxypropylthiolcarbamate
2-chloroethyl diallylthiolcarbamate
2-chloroethyl N-allyl-N-propylthiolcarbamate
2-chloroethyl 1-pyrrolidinecarbothiolate
2-bromoethyl 1-pyrrolidinecarbothiolate
2-chloroethyl 1-piperidinecarbothiolate
2-chloroethyl 5-ethyl-2-methyl-1-piperidinecarbothiolate
2-chloroethyl 5-ethyl-3-methyl-1-piperidinecarbothiolate
3-chloropropyl N-ethyl-N-cyclohexylthiolcarbamate
2-chloroethyl N-ethyl-N-cyclohexylthiolcarbamate
2-chloroethyl N-methyl-N-cyclohexylthiolcarbamate
3-chloropropyl N-isopropyl-N-cyclohexylthiolcarbamate
2-chloroethyl N,N-diethylthiolcarbamate
2-chloroethyl N-allyl-N-isobutylthiolcarbamate
2-chloroethyl N-allyl-N-isopropylthiolcarbamate
2-chloroethyl N-methyl-N,n-butylthiolcarbamate
2-chloroethyl N-ethyl-N,n-butylthiolcarbamate
2-chloroethyl N-methallyl-N-ethylthiolcarbamate
2-chloroethyl N-methallyl-N-propylthiolcarbamate
2-chloroethyl N-propargyl-N,n-propylthiolcarbamate
3-chloropropyl N-ethyl-N,n-butylthiolcarbamate
3-chloropropyl N,N-diallylthiolcarbamate
3-chloropropyl N-methallyl-N-allylthiolcarbamate
2-chloroethyl N-methallyl-N-allylthiolcarbamate
3-chloropropyl N-propyl-2-propargylthiolcarbamate
3-chloropropyl N-methallyl-N,n-propylthiolcarbamate
3-chloropropyl N-allyl-N,n-propylthiolcarbamate
3-chloropropyl N-2-chloroallyl-N,n-propylthiolcarbamate
3-chloropropyl N-3-chloroallyl-N-allylthiolcarbamate
2-chloroethyl N-3-chloroallyl-N-propylthiolcarbamate
3-chloropropyl N-allyl-N-octylthiolcarbamate
3-chloropropyl N-allyl-N-propargylthiolcarbamate
3-chloropropyl N-ethyl-N-phenylthiolcarbamate
2-chloroethyl N-ethyl-N-phenylthiolcarbamate
3-chloropropyl N - ethyl-N-tetrahydrofurfurylthiolcarbamate
2-chloroethyl N - propyl-N-tetrahydrofurfurylthiolcarbamate
3-chloropropyl N-ethyl-N-furfurylthiolcarbamate
3-chloropropyl N-propyl-N-furfurylthiolcarbamate
3-chloropropyl N-methyl-N-phenylthiolcarbamate
3-chloropropyl N-benzyl-N-methylthiolcarbamate
3-chloropropyl N-benzyl-N-ethylthiolcarbamate
3-chloropropyl N-methyl-N-octylthiolcarbamate
3-chloropropyl N-amyl-N-octylthiolcarbamate
3-chloropropyl N-methyl-N-dodecylthiolcarbamate
3-chloropropyl N-ethyl-N-dodecylthiolcarbamate
2-chloroethyl N-propyl-N-decylthiolcarbamate
3-chloropropyl N - isopropyl-N-tetrahydrofurfurylthiolcarbamate
3-chloropropyl N - allyl-N-tetrahydrofurfurylthiolcarbamate
3-chloropropyl 4-morpholinecarbothiolate
2-bromoethyl N-allyl-N-cyclohexylthiolcarbamate
2-chloroethyl N-allyl-N-cyclohexenylthiolcarbamate
3-chloropropyl N-allyl-N-phenylthiolcarbamate
3-chloropropyl N-allyl-N-furfurylthiolcarbamate
3-chloropropyl N-allyl-N-benzylthiolcarbamate
3-chloropropyl N - allyl-N-isopropoxypropylthiolcarbamate
3-chloropropyl N-allyl-N-phenoxyethylthiolcarbamate
2-chloroethyl di(2-cyanoethyl)thiolcarbamate
2-chloroethyl N-allyl-N-2-cyanoethylthiolcarbamate
2-chloroethyl N-allyl-N-vinyloxyethylthiolcarbamate and
2-chloroethyl di(vinyloxyethyl)thiolcarbamate It is intended to cover all changes and modifications of the examples of the invention herein chosen for purposes of disclosure which do not constitute departures from the spirit and scope of the invention.

What is claimed is:
1. The method of destroying vegetation which comprises applying to germinating seedlings a phytotoxic amount of a composition containing as the essential active ingredient 3-chloropropyl diisopropylthiolcarbamate.
2. A herbicidal composition comprising a major proportion of a herbicidal adjuvant as carrier and a minor but phytotoxic concentration of 3-chloropropyl diisopropylthiolcarbamate.

References Cited by the Examiner

UNITED STATES PATENTS

| | | | |
|---|---|---|---|
| 2,060,733 | 11/1936 | Hunt et al. | 260—455 X |
| 2,160,880 | 6/1939 | Loane et al. | |
| 2,562,011 | 7/1951 | Baumgartner | 71—2.7 |
| 2,642,451 | 6/1953 | Weijlard et al. | 260—455 |
| 2,687,348 | 8/1954 | Kosmin | 71—2.7 |
| 2,863,899 | 12/1958 | Harris. | |
| 2,901,500 | 8/1959 | Tilles et al. | 260—455 |
| 2,916,370 | 12/1959 | Tilles | 71—2.7 |
| 2,984,559 | 6/1961 | D'Amico | 71—2.7 X |
| 2,989,393 | 6/1961 | Tilles et al. | 71—2.7 X |
| 2,992,091 | 7/1961 | Harman et al. | 71—2.6 |

FOREIGN PATENTS 862,250  3/1961  Great Britain.

OTHER REFERENCES

Davies et al. in "Chemical Journal," vol. 40, 1946, pages 331–334.

Gentner et al., "An Evaluation of Several Chemicals for Their Herbicidal Properties," January 1958, pages 5, 6 and 10, U.S. Agriculture Research Service, Corps Research Division.

Tilles: J.A.C.S., vol. 81, No. 3, February 1959, July 21, 1958, pages 714 to 727, pages 717 and 720.

ELBERT L. ROBERTS, *Primary Examiner.*

CHARLES B. PARKER, MAURICE A. BRINDISI, LEWIS GOTTS, *Examiners.*

J. P. BRUST, J. O. THOMAS, *Assistant Examiners.*